United States Patent
Goesselsberger et al.

(10) Patent No.: US 12,472,892 B2
(45) Date of Patent: Nov. 18, 2025

(54) VEHICLE HAVING A LIVING ROOM MODE

(71) Applicant: Bayerische Motoren Werke Aktiengesellschaft, Munich (DE)

(72) Inventors: Christoph Goesselsberger, Beijing (CN); Keith Young, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 17/801,400

(22) PCT Filed: Mar. 18, 2020

(86) PCT No.: PCT/CN2020/079899
§ 371 (c)(1),
(2) Date: Aug. 22, 2022

(87) PCT Pub. No.: WO2021/184238
PCT Pub. Date: Sep. 23, 2021

(65) Prior Publication Data
US 2023/0077574 A1    Mar. 16, 2023

(51) Int. Cl.
*B60R 16/03*    (2006.01)
(52) U.S. Cl.
CPC .................. *B60R 16/03* (2013.01)
(58) Field of Classification Search
None
See application file for complete search history.

(56) References Cited

U.S. PATENT DOCUMENTS

| | | | |
|---|---|---|---|
| 5,317,998 A * | 6/1994 | Hanson | F02N 11/0803 307/10.6 |
| 7,027,912 B1 * | 4/2006 | Metzger | B60H 1/00778 701/112 |
| 9,333,832 B2 | 5/2016 | Burns et al. | |
| 2003/0030325 A1 | 2/2003 | Shinada et al. | |
| 2014/0171260 A1 | 6/2014 | Dalum | |
| 2014/0371983 A1 | 12/2014 | Miyashita et al. | |
| 2015/0283991 A1 * | 10/2015 | Dalum | B60W 20/20 903/902 |

(Continued)

FOREIGN PATENT DOCUMENTS

| | | |
|---|---|---|
| CN | 103192821 A | 7/2013 |
| CN | 103223907 A | 7/2013 |

(Continued)

OTHER PUBLICATIONS

International Search Report (PCT/ISA/210) issued in PCT Application No. PCT/CN2020/079899 dated Dec. 16, 2020 (five (5) pages).

(Continued)

*Primary Examiner* — Adam D Tissot
(74) *Attorney, Agent, or Firm* — Crowell & Moring LLP

(57) ABSTRACT

A vehicle includes a power unit, wherein the power unit includes an internal combustion engine and/or a power battery. The vehicle is provided with a living room mode, which can be activated in a parking state of the vehicle. When the living room mode is activated, the power unit of the vehicle can provide the vehicle with functions related to leisure, entertainment and/or office, but does not provide functions related to drive readiness.

20 Claims, 3 Drawing Sheets

(56) References Cited

U.S. PATENT DOCUMENTS

| | | | |
|---|---|---|---|
| 2016/0159339 A1* | 6/2016 | Cho | B60K 6/442 180/65.265 |
| 2016/0375924 A1* | 12/2016 | Bodtker | B60K 35/60 74/552 |
| 2016/0375927 A1* | 12/2016 | Schulz | B60R 21/2338 280/775 |
| 2018/0056971 A1 | 3/2018 | Inoue et al. | |
| 2018/0196589 A1 | 7/2018 | Feit et al. | |

FOREIGN PATENT DOCUMENTS

| | | |
|---|---|---|
| CN | 103987581 A | 8/2014 |
| CN | 105329146 A | 2/2016 |
| CN | 106335460 A | 1/2017 |
| CN | 106364544 A | 2/2017 |
| CN | 207902096 U | 9/2018 |
| CN | 108791139 A | 11/2018 |
| CN | 110382280 A | 10/2019 |
| FR | 3 023 818 A1 | 1/2016 |
| JP | 9-76740 A | 3/1997 |
| JP | 2002-370591 A | 12/2002 |

OTHER PUBLICATIONS

Written Opinion (PCT/ISA/237) issued in PCT Application No. PCT/CN2020/079899 dated Dec. 16, 2020 (four (4) pages).
English translation of Chinese-language Office Action issued in Chinese Application No. 202080094876.0 dated Jan. 19, 2025 (10 pages).

* cited by examiner

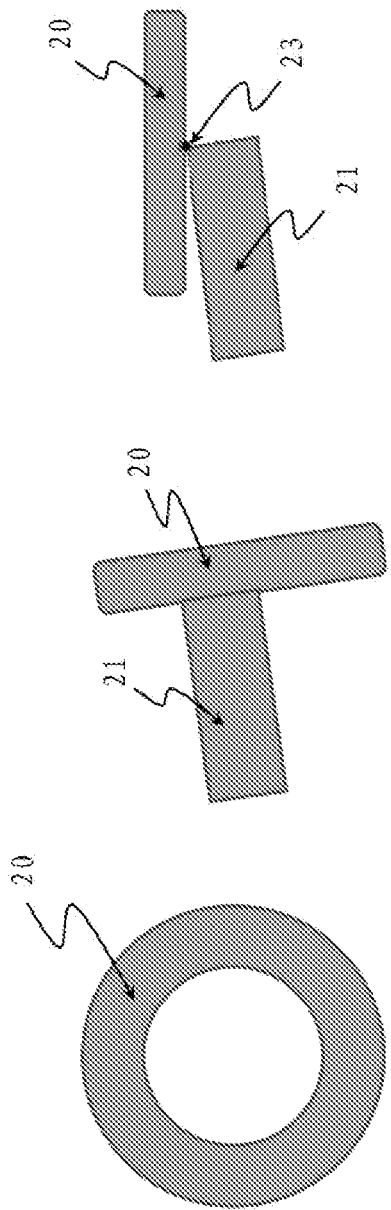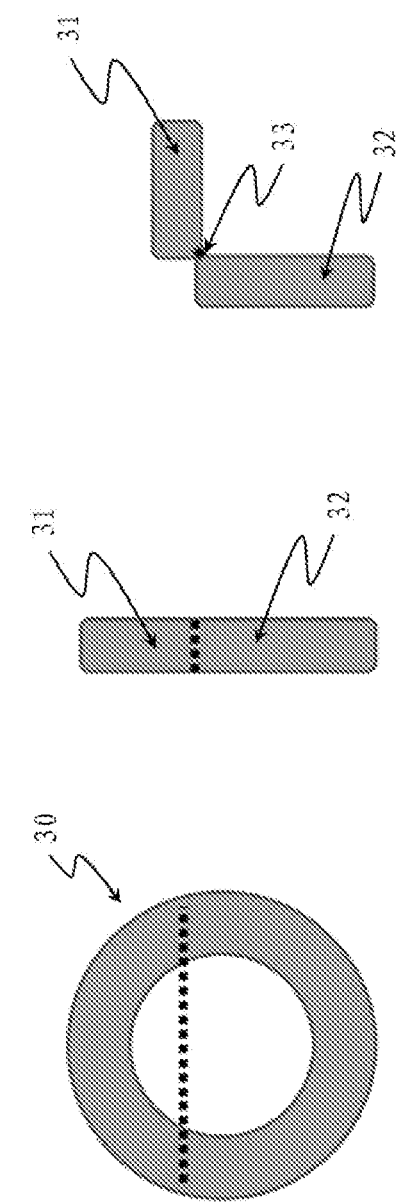

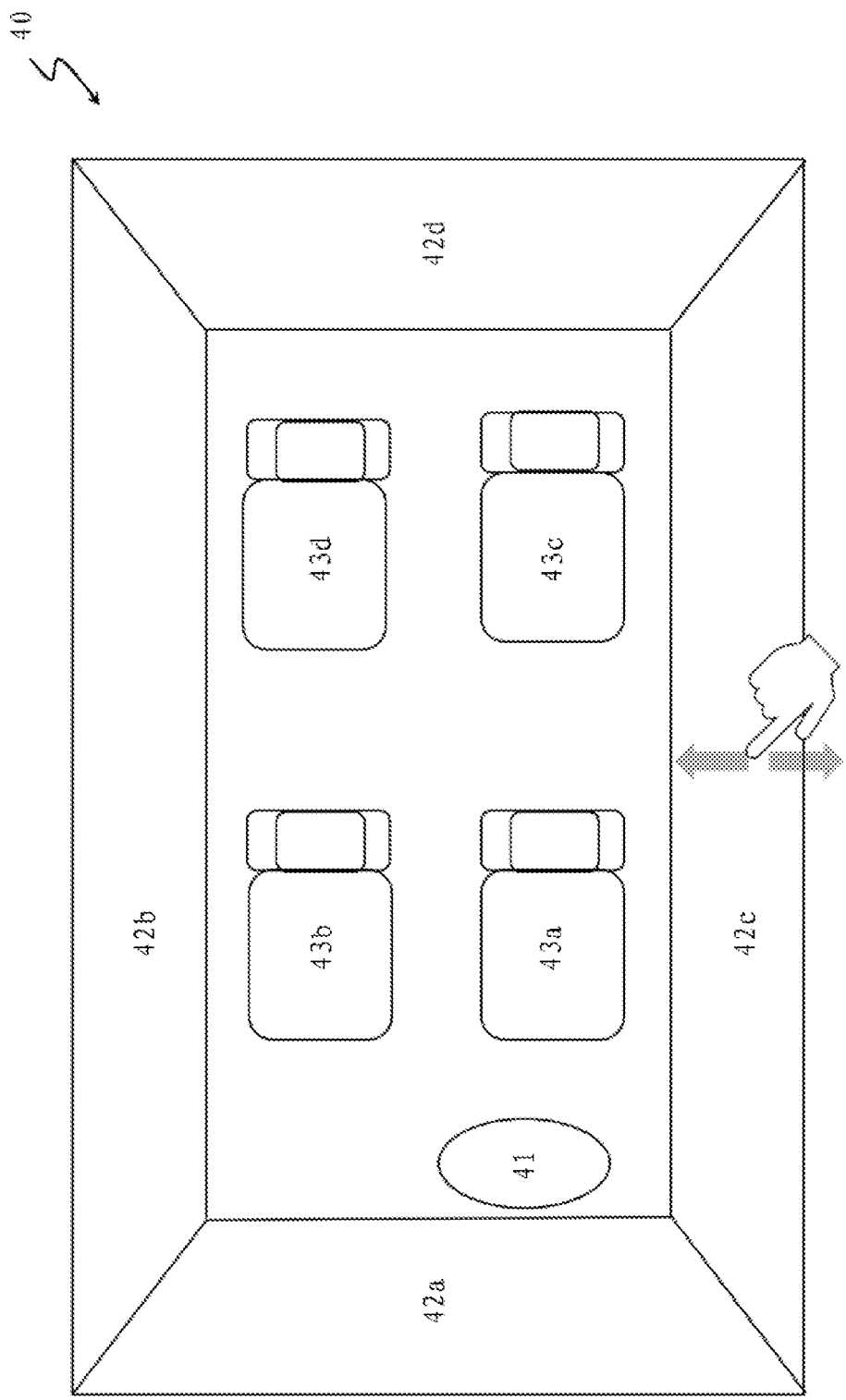

VEHICLE HAVING A LIVING ROOM MODE

TECHNICAL FIELD

The present invention relates to a vehicle.

BACKGROUND ART

In the use of existing vehicles, users are often in situations where they have to wait for a long time in the vehicle and/or situations where they may want to use heating/cooling systems, entertainment systems, and other functions not related to driving or drive readiness. Currently, in the prior art vehicles, comfort or office functions cannot be appropriately provided while the vehicle has to wait for a long time.

SUMMARY OF THE DISCLOSURE

The inventors of the present invention have found that currently, when the vehicle is waiting for a long time, the vehicle is usually set in a "START ON" or "STOP (CLOSE DOWN)" state.

In the case where the vehicle is an internal combustion engine vehicle, in the "START ON" state, the vehicle is stopped and the start switch is activated, and the internal combustion engine is in an idling state, but the idling state of the internal combustion engine may cause undesired vibrations in the interior of the vehicle. The use of comfort-related functions leads to higher fuel consumption of the internal combustion engine in the "START ON" state. In the case where the vehicle is a NEV (New Energy Vehicle, such as a pure electric vehicle), in the "START ON" state, the start switch is activated and the vehicle is in a driving-ready state, in such state all driving-related functions are activated and in the state of drive-readiness, such as activating the air-conditioning function for the high-voltage battery and continuously pre-adjusting the temperature of the high-voltage battery, thereby making the high-voltage battery suitable for providing peak energy at any time, but this will result in higher energy consumption in the "START ON" state.

In the "STOP" state, the vehicle is parked, and the start switch of the vehicle is turned off. In the case where the vehicle is an internal combustion engine vehicle, the internal combustion engine is shut down, and in the case where the vehicle is a NEV (for example, a pure electric vehicle), the high-voltage battery of the vehicle is deactivated. In the "STOP" state, the comfort functions that the vehicle can provide are very limited. In this "STOP" state, the air-conditioning function in the vehicle is usually not available. Some simple leisure and entertainment functions (such as broadcasting and lighting) can still be used, but for the purpose of protecting the 12V battery, these leisure and entertainment functions usually last for 10 minutes and will close. The inventors of the present invention have found that, with regard to the vehicles in the prior art, when the vehicle is waiting for a long time, for example for more than 10 minutes, it may be uncomfortable.

In addition, the inventors of the present invention have also found that in the "START ON" state of the vehicle, that is, in the state of drive-readiness of the vehicle, according to the regulations of some countries or regions, the driver of the vehicle must have a valid driving license and must meet the driving conditions (such as not drinking alcohol).

In view of the above, the object of the present invention is to propose a vehicle provided with a "living room mode". In the newly proposed living room mode, greater flexibility and comfort can be brought to the driver and/or vehicle occupants with improved economy.

The aforesaid object is achieved by the vehicle according to the invention, the vehicle including a power unit, wherein the power unit includes an internal combustion engine and/or a power battery, characterized in that the vehicle is provided with a living room mode, which can be activated in a parking state of the vehicle, wherein when the living room mode is activated, the power unit of the vehicle can provide the vehicle with functions related to leisure, entertainment and/or office, but does not provide functions related to drive readiness. As a result, the vehicle according to the invention can bring greater flexibility and comfort to the driver and/or vehicle occupant with improved economy, especially during long parking waits.

In a specific embodiment, when the living room mode is activated, the power unit of the vehicle is in an intermediate state between a completely close-down state and a drive-readiness state.

In a specific embodiment in a case where the power unit includes an internal combustion engine, and when the living room mode is activated, the internal combustion engine is operated in a re-calibrated condition so that under the recalibrated condition the internal combustion engine can provide the vehicle with functions related to leisure, entertainment and/or office, and can ensure a more efficient operation than under engine idle condition, in particular a more efficient recharging of the vehicle battery (e.g. 12V or HV-Battery) than under engine idle condition. At the same time, this re-calibration minimizes uncomfortable vibration caused by idling conditions.

In a specific embodiment, the recalibrated conditions of the internal combustion engine include: adjustment of the speed of the internal combustion engine; adjustment of operating time of the internal combustion engine; and/or adjustment of the load of the internal combustion engine.

In a specific embodiment in a case where the power unit includes a power battery, and when the living room mode is activated, the power battery can provide the vehicle with functions related to leisure, entertainment and/or office, but the energy consumption for temperature conditioning of the power battery is lower than that in the driving-ready state.

In a specific embodiment, when the living room mode is activated,
- functions related to drive readiness are deactivated, such as stabilization systems or driving sensors;
- functions related to leisure, entertainment and/or office remain available, such as seat heating, continuous operation of the entertainment system, interior air conditioning, seat position adjustment, light adjustment, window adjustment or power supply function for charging personal smart terminals.

In a specific embodiment when the power unit includes an internal combustion engine or a range extender, the internal combustion engine or the range extender can be used for recharging the vehicle battery, wherein when the living room mode is activated, the internal combustion engine or the range extender operates in a recalibrated condition so that the vehicle battery can be effectively charged and used to provide the vehicle with functions related to leisure, entertainment and/or office, but the fuel consumption of the internal combustion engine or the range extender is lower than under idle condition while re-charging the vehicle battery.

In a specific embodiment when the state of charge of the vehicle battery is lower than a predetermined value, the internal combustion engine or the range extender is used to recharge the vehicle battery, wherein the predetermined value is, for example, in a range of 10% to 50%, preferably at 20%, preferably, the user can personally set the predetermined value according to the usage situation.

In a specific embodiment, the steering wheel of the vehicle is articulated to the steering shaft, and in the living room mode, the steering wheel can be pivoted at an angle relative to the steering shaft so that the steering wheel forms an office countertop.

In a specific embodiment, the steering wheel of the vehicle has a two-part construction, wherein the first part is articulated to the second part, and in the case of the living room mode, the first part of the steering wheel can be pivoted at an angle relative to the second part so that the first part forms an office countertop.

In a specific embodiment, the steering wheel can be used as an input device to collaborate with the head-up display system of the vehicle for office use.

In a specific embodiment, the vehicle is provided with a voice recognition device and/or a control button. The vehicle occupant (especially the driver) can realize the following actions through the voice recognition device by means of the speech and/or through the control button manually: activating the living room mode; or exiting the living room mode. For example, after the voice recognition device is activated by wakeup words: when the vehicle occupant says, "entering the living room mode", an instruction to activate the living room mode is generated by the voice recognition.

In a specific embodiment, the vehicle includes a communication device, with which a personal intelligent terminal can be communicated for inputting the identity authentication data and/or personal information data stored in the personal intelligent terminal. The personal intelligent terminal may be a personal smart phone or a personal smart wearable device. In this regard, the invention proposes to use the personal smart terminal to identify and authenticate a vehicle occupant. Preferably, when activating the living room mode, the vehicle adapts the vehicle internal configuration for example according to the personal information data (e.g. sex, height, weight, age, etc. of the occupant) stored in the personal intelligent terminal.

In a specific embodiment, the vehicle includes a control panel that displays the vehicle interior space configuration in a two-dimensional or three-dimensional manner. In the event of the activated living room mode, the vehicle occupant can manipulate the components in the displayed vehicle interior space configuration by gestures, in order to make a personalized adaptation for the vehicle internal configuration.

The vehicle according to the present invention can be any kind of car, for example, an ICE vehicle, a hybrid vehicle, a fuel cell vehicle, or a pure electric vehicle.

The invention proposes a vehicle with a living room mode, by means of which the vehicle can bring greater flexibility and comfort to the driver and/or vehicle occupant with improved economy, especially during long parking waits. In addition, when the living room mode of the vehicle of the present invention is activated, since the vehicle does not have functions related to drive readiness at this time, it can provide economical and comfortable office and entertainment feasibility for non-drivers without violating corresponding regulations.

BRIEF DESCRIPTION OF THE DRAWINGS

FIGS. 2a-2c schematically illustrate a first embodiment of a vehicle steering wheel according to the present invention, wherein an office countertop can be formed by pivoting the steering wheel relative to the steering shaft, wherein FIGS. 2a and 2b respectively show a front view and a side view of the steering wheel of this embodiment in the state of drive-readiness, and FIG. 2c shows a side view of the steering wheel of this embodiment in the living room mode.

FIGS. 3a-3c schematically illustrate a second embodiment of a vehicle steering wheel according to the present invention, wherein the steering wheel is constructed in two parts, and an office countertop can be formed by pivoting the first part of the steering wheel relative to the second part, wherein FIGS. 3a and 3b respectively show a front view and a side view of the steering wheel of this embodiment in the state of drive-readiness, and FIG. 3c shows a side view of the steering wheel of this embodiment in the living room mode.

FIG. 4 schematically illustrates an exemplary embodiment of a vehicle control panel according to the present invention.

DETAILED DESCRIPTION OF THE EMBODIMENTS

Figure 1:
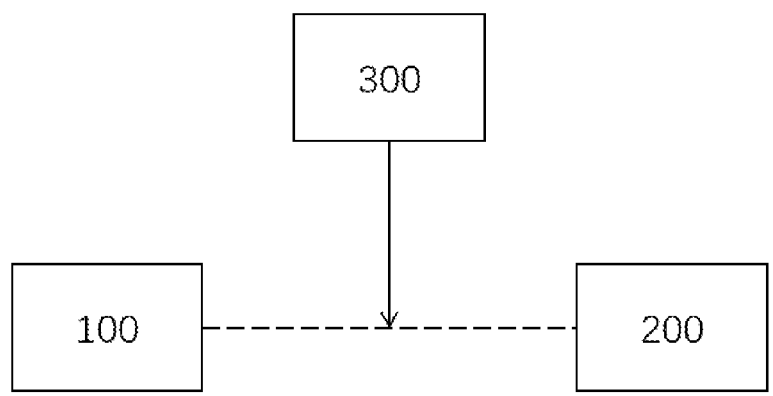
FIG. 1 is a schematic block diagram of an embodiment of a vehicle according to the invention.

To make the aforementioned objects, features and advantages of the present invention clearer and easier to understand, detailed explanations are made hereinafter for particular embodiments of the present invention by combining the drawings.

Details are explained below to facilitate a full comprehension of the present invention. However, the invention can be implemented in manners other than what is explained here, and those skilled in the art can make a similar improvement without going against connotation of the invention. Therefore, the present utility model is not limited by the particular embodiments as disclosed below.

The expression "and/or" is used herein to include at least one of the components listed before and after the expression. The use of "comprising", "including" or "having" the components, steps, operations, and elements means that there is, or may be added, at least one other component, step, operation, and element.

It should be understood, the terms "vehicle" or "vehicle's" or similar terms as used herein generally include motor vehicles, such as passenger vehicles including sports utility vehicles (SUVs), buses, large trucks, and various commercial vehicles, etc., and also include hybrid vehicles, electric vehicles, plug-in hybrid electric vehicles, hydrogen powered vehicles, and other alternative fuel vehicles (for example, fuels that are not from petroleum). As referred to herein, a hybrid vehicle is a vehicle having two or more sources of power, such as a vehicle of both gasoline and electric power.

FIG. 1 shows a block diagram of an embodiment of a vehicle. The vehicle includes a power unit, wherein the power unit includes an internal combustion engine and/or a power battery. The vehicle is provided with a living room mode, which can be activated in a parked state of the vehicle, wherein when the living room mode is activated, the power unit of the vehicle can provide the vehicle with functions related to leisure, entertainment and/or office, but does not provide functions related to drive readiness. The "STOP" state 100 and the "START ON" state 200 of the vehicle are shown schematically in blocks in FIG. 1. In the "STOP" state 100, the vehicle is parked, and the start switch is turned off. In the "START ON" state 200, the vehicle is stopped, and the start switch is activated, for example, the vehicle key is inserted and set in the start position. In this "START ON" state 200, the components in the vehicle are generally in the state of drive-readiness. According to a preferred embodiment of the present invention, when the living room mode is activated, the power unit of the vehicle is in an intermediate state 300 between the "STOP" state 100 (completely shut down) and the "START ON" state 200 (ready for driving).

The vehicle according to the present invention can be any kind of vehicle, for example, an ICE vehicle, a hybrid vehicle, a fuel cell vehicle, or a pure electric vehicle.

In a case where the power unit includes an internal combustion engine, preferably, when the living room mode is activated, the internal combustion engine is operated in a recalibrated condition so that under the recalibrated condition the internal combustion engine can provide the vehicle with functions related to leisure, entertainment and/or office, and can ensure a more efficient operation than under engine idle condition, in particular a more efficient recharging of the vehicle battery (e.g. 12V or HV-Battery) than under engine idle condition. At the same time, the recalibration minimizes uncomfortable vibration caused by idling conditions. Preferably, the recalibrated conditions of the internal combustion engine include: adjustment of the speed of the internal combustion engine; adjustment of operating time of the internal combustion engine; and/or adjustment of the load of the internal combustion engine.

In a case where the power unit includes a power battery, and when the living room mode is activated, the power battery can provide the vehicle with functions related to leisure, entertainment and/or office, but the energy consumption for temperature conditioning of the power battery is lower than that in the driving-ready state.

Preferably, when the living room mode is activated, functions related to drive readiness are deactivated, such as stabilization systems or driving sensors. Preferably, when the living room mode is activated, functions related to leisure, entertainment and/or office remain available, such as seat heating, continuous operation of the entertainment system, interior air conditioning, seat position adjustment, light adjustment, window adjustment or power supply function for charging personal smart terminals.

Preferably, when the power unit includes an internal combustion engine or a range extender, the internal combustion engine or the range extender can be used for recharging the vehicle battery, wherein when the living room mode is activated, the internal combustion engine or the range extender operates in a recalibrated condition so that the vehicle battery can be effectively charged and used to provide the vehicle with functions related to leisure, entertainment and/or office, but the fuel consumption of the internal combustion engine or the range extender is lower than under idle condition while re-charging the vehicle battery. Preferably, when the state of charge of the vehicle battery is lower than a predetermined value, the internal combustion engine or the range extender is used to recharge the vehicle battery, wherein the predetermined value is, for example, in a range of 10% to 50%, preferably at 20%, preferably, the user can personally set the predetermined value according to the usage situation.

Preferably, when the living room mode is activated, the steering wheel can be folded or reshaped to form an office countertop in front of the driver In a specific embodiment, the steering wheel of the vehicle is articulated to the steering shaft, and in the living room mode, the steering wheel can be pivoted at an angle relative to the steering shaft so that the steering wheel can form an office countertop.

FIGS. 2a-2c schematically illustrate a first embodiment of a vehicle steering wheel, wherein FIGS. 2a and 2b respectively show a front view and a side view of the steering wheel of this embodiment in the state of drive-readiness, and FIG. 2c shows a side view of the steering wheel of this embodiment in the living room mode. As shown in this specific embodiment, the steering wheel 20 of the vehicle is articulated to the steering shaft 21. In the case of the living room mode, the steering wheel 20 can be pivoted about the hinge point 23 at an angle relative to the steering shaft 21, so that the steering wheel 20 forms an office countertop.

FIGS. 3a-3c schematically illustrate a second embodiment of a vehicle steering wheel, wherein FIGS. 3a and 3b respectively show a front view and a side view of the steering wheel of this embodiment in the state of drive-readiness, and FIG. 3c shows a side view of the steering wheel of this embodiment in the living room mode. As shown in this specific embodiment, the steering wheel 30 of the vehicle is constructed in two parts (that is, composed of a first part 31 and a second part 32), wherein the first part 31 and the second part 32 are articulated. In the case of the living room mode, the first part 31 of the steering wheel can be pivoted at an angle relative to the second part 32 around the hinge point 33, so that the first part 31 forms an office countertop.

Preferably, the pivoting angle of the steering wheel 20 or the first portion 31 of the steering wheel 30 can be adjusted arbitrarily. Preferably, the input device can be integrated into the steering wheel 20 or the first part 31 of the steering wheel 30. More preferably, the steering wheels 20, 30 can work as input devices in cooperation with the head-up display system of the vehicle for office use.

Preferably, the vehicle includes a control panel that displays the vehicle interior space configuration in a two-dimensional or three-dimensional manner in the event of the activated living room mode, the vehicle occupant can manipulate the components in the displayed vehicle interior space configuration by gestures, in order to make a personalized adaptation for the vehicle internal configuration. FIG. 4 schematically illustrates an exemplary embodiment of a vehicle control panel 40. The control panel 40 in FIG. 4 schematically shows the internal space arrangement of the vehicle in a two-dimensional manner, including but not limited to, a steering wheel 41, windows (including a front window 42a, a right window 42b, and a left window 42c and a rear window 42d), seats (including driver seat 43a, front passenger seat 43b, and two rear seats 43c, 43d). Preferably, when the living room mode is activated, one or more of the following can be adjusted through gesture manipulation in the control panel 40: the position and/or direction and/or the seat inclination angle of each seat; Interior lights; folding or reshaping of the steering wheel; brightness of the window glass; activation of the head-up display system on the front window. For example, when the vehicle occupant manipulates in the control panel 40 in the displayed region of the window (in the shown embodiment in the region of the left window 42c), if his/her fingertip touches the screen and swipes up, the window region will be brightened (i.e. the light transmittance of the window will be increased), and conversely, if the fingertip touches the screen to swipe down, this window region will be dimmed (i.e., the light transmittance of the window will be reduced). For example, when the vehicle occupant manipulates in the control panel 40 in the region of the displayed front window 42a, if his/her fingertip double-clicks this area, the head-up display system will be activated; if the fingertip double-clicks this area again, the head-up display system will be disabled. For example, when the vehicle occupant manipulates in the control panel 40 in the region of the steering wheel 41, if his/her fingertip double-clicks this region, the steering wheel 41 (or it first part) will be pivoted to form an office countertop; if the fingertip double-clicks this region again, the steering wheel will return back to the driving position. For example, the vehicle occupant can adjust the rotation angle of the respective seat by means of a twisting gesture of two fingers in the shown region of the vehicle seat, and the vehicle occupant can conduct the translation of the respective seat and/or the reclining of the backrest by dragging respective region by the finger.

Preferably, in the case where the control panel 40 is not accessible by the finger of the vehicle occupant (e.g. the driver), it is also conceivable to manipulate the control panel 40 through telekinetic gestures; or it is conceivable to adapt the internal space arrangement displayed on the control panel 40 by means of a pressing-rotating element arranged on the center console or on the seat or on the steering wheel (or on the other occupant accessible area).

The present invention is not limited to the embodiments shown but includes or extends to all technical equivalents falling within the effective range of the appended claims. The positional descriptions selected in the description such as "top", "bottom", "left", "right", etc., refer to the direct description and the illustrated figures and can be transferred to new positions in accordance with the meaning when the position changes.

Although the present invention has been described in terms of preferred embodiments, it is not intended to limit the invention thereto. Those skilled in the art can make variations and modifications to the invention by utilizing the above-described methods and technical contents without departing from the spirit and scope of the invention. Accordingly, any contents that do not depart from the technical solution of the invention, and all such simple modifications, equivalents and alterations made to the aforesaid embodiments according to the technical spirit of the invention, are considered as being within the protection scope of the technical solution of the invention.

The invention claimed is:

1. A vehicle, comprising:
   a power unit, wherein the power unit includes an internal combustion engine and/or a high voltage power battery,
   wherein the vehicle has a living room mode powered by the power unit, which is activatable for an extended period of time in a parked state of the vehicle,
   wherein the power unit of the vehicle provides the vehicle with functions related to leisure, entertainment and/or office, but does not provide functions related to drive readiness, in the living room mode, and
   wherein, in the living room mode, the power unit of the vehicle is in an intermediate state between a completely close-down state in which the vehicle is parked and a start switch is off while the internal combustion engine is shut down and/or the high voltage power battery is deactivated, and a drive-readiness state in which the internal combustion engine is in an idling state and/or the start switch is activated for driving under peak power from the high voltage battery,
   wherein, in a case where the power unit includes an internal combustion engine, and in the living room mode, the internal combustion engine is configured to operate in a re-calibrated condition so that under the recalibrated condition the internal combustion engine provides the vehicle with the functions related to leisure, entertainment and/or office, and ensures a more efficient operation than under idle condition.

2. The vehicle according to claim 1, wherein
   the recalibrated condition of the internal combustion engine comprise one or more of: adjustment of a speed of the internal combustion engine, adjustment of operating time of the internal combustion engine, or adjustment of a load of the internal combustion engine.

3. The vehicle according to claim 1, wherein, in the living room mode:
   (i) functions related to drive readiness are deactivated,
   (ii) functions related to leisure, entertainment and/or office remain available.

4. The vehicle according to claim 3, wherein
   the functions related to drive readiness comprise as stabilization systems or driving sensors; and
   the functions related to leisure, entertainment and/or office remain available comprise seat heating, continuous operation of the entertainment system, interior air conditioning, seat position adjustment, light adjustment, window adjustment or power supply function for charging personal smart terminals.

5. The vehicle according to claim 1, wherein, when the power unit includes the internal combustion engine or a range extender, the internal combustion engine or the range extender is used for recharging the vehicle battery,
   wherein, in the living room mode, the internal combustion engine or the range extender operates in a recalibrated condition so that the vehicle battery is charged and used to provide the vehicle with functions related to leisure, entertainment and/or office, but fuel consumption of the internal combustion engine or the range extender is lower than that under idle condition while re-charging the vehicle battery.

6. The vehicle according to claim 5, wherein, when the state of charge of the vehicle battery is lower than a predetermined value, the internal combustion engine or the range extender is used to recharge the vehicle battery,
   wherein the predetermined value is in a range of 10% to 50%.

7. The vehicle according to claim 6, wherein
   the predetermined value is personally settable by a user according to a usage situation.

8. The vehicle according to claim 1, wherein
   a steering wheel of the vehicle is articulated to a steering shaft, and,
   in the living room mode, the steering wheel is pivotable at an angle relative to the steering shaft so that the steering wheel forms an office countertop.

9. The vehicle according to claim 1, wherein
   a steering wheel of the vehicle has a two-part construction,
   the first part is articulated to the second part, and
   in the case of the living room mode, the first part of the steering wheel is pivotable at an angle relative to the second part so that the first part forms an office countertop.

10. The vehicle according to claim 9, wherein
    the steering wheel is useable as an input device to collaborate with a head-up display system of the vehicle for office use.

11. The vehicle according to claim 8, wherein
    the steering wheel is useable as an input device to collaborate with a head-up display system of the vehicle for office use.

12. The vehicle according to claim 1, wherein the vehicle is an ICE vehicle, a hybrid vehicle, or a fuel cell vehicle.

13. A vehicle, comprising:
a power unit, wherein the power unit includes an internal combustion engine and/or a high voltage power battery,
wherein the vehicle has a living room mode powered by the power unit, which is activatable for an extended period of time in a parked state of the vehicle,
wherein the power unit of the vehicle provides the vehicle with functions related to leisure, entertainment and/or office, but does not provide functions related to drive readiness, in the living room mode, and
wherein, in the living room mode, the power unit of the vehicle is in an intermediate state between a completely close-down state in which the vehicle is parked and a start switch is off while the internal combustion engine is shut down and/or the high voltage power battery is deactivated, and a drive-readiness state in which the internal combustion engine is in an idling state and/or the start switch is activated for driving under peak power from the high voltage battery,
wherein, in a case where the power unit includes the power battery, and in the living room mode, the power battery is configured to provide the vehicle with the functions related to leisure, entertainment and/or office, but energy consumption for temperature conditioning of the power battery is lower than that in the drive-readiness state.

14. The vehicle according to claim 13, wherein, in the living room mode:
(i) functions related to drive readiness are deactivated,
(ii) functions related to leisure, entertainment and/or office remain available.

15. The vehicle according to claim 14, wherein
the functions related to drive readiness comprise as stabilization systems or driving sensors; and
the functions related to leisure, entertainment and/or office remain available comprise seat heating, continuous operation of the entertainment system, interior air conditioning, seat position adjustment, light adjustment, window adjustment or power supply function for charging personal smart terminals.

16. The vehicle according to claim 13, wherein
a steering wheel of the vehicle is articulated to a steering shaft, and,
in the living room mode, the steering wheel is pivotable at an angle relative to the steering shaft so that the steering wheel forms an office countertop.

17. The vehicle according to claim 13, wherein
a steering wheel of the vehicle has a two-part construction,
the first part is articulated to the second part, and
in the case of the living room mode, the first part of the steering wheel is pivotable at an angle relative to the second part so that the first part forms an office countertop.

18. The vehicle according to claim 16, wherein
the steering wheel is useable as an input device to collaborate with a head-up display system of the vehicle for office use.

19. The vehicle according to claim 17, wherein
the steering wheel is useable as an input device to collaborate with a head-up display system of the vehicle for office use.

20. The vehicle according to claim 13, wherein the vehicle is a hybrid vehicle or a pure electric vehicle.

\* \* \* \* \*